UNITED STATES PATENT OFFICE.

LEOPOLD HESSE AND OSCAR GÜNTHER, OF ELBERFELD, AND ARTHUR ZART, OF VOHWINKEL, NEAR ELBERFELD, GERMANY, ASSIGNORS TO FARBENFABRIKEN VORM. FRIEDR. BAYER & CO., OF ELBERFELD, GERMANY, A CORPORATION OF GERMANY.

AZO DYE.

No. 931,424.

Specification of Letters Patent.

Patented Aug. 17, 1909.

Application filed April 8, 1909. Serial No. 488,699.

*To all whom it may concern:*

Be it known that we, LEOPOLD HESSE, OSCAR GÜNTHER, and ARTHUR ZART, doctors of philosophy, chemists, citizens of the German Empire, residing at, respectively, Elberfeld, Elberfeld, and Vohwinkel, near Elberfeld, Kingdom of Prussia, Germany, have invented new and useful Improvements in New Azo Dyes, of which the following is a specification.

This invention relates to the manufacture and production of new secondary disazo dyestuffs dyeing cotton from red to blue shades remarkable for their fastness to light. They are obtained by combining diazotized aminoazo compounds of the naphthalene series obtainable from naphthylamin compounds, especially naphthylamins, their sulfonic acids, alpha-beta-, and beta-beta- aminonaphthol sulfonic acids and suitable amins with acidylized derivatives of 2-amino-5-naphthol compounds having the formula:

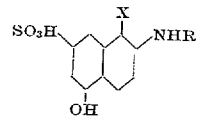

(R meaning an acid radical, X meaning hydrogen or —$SO_3H$).

The new dyestuffs are in the shape of their alkaline salts dark powders easily soluble in water. Upon reduction with stannous chlorid and hydrochloric acid the dyestuffs are decomposed, a naphthylamin compound, a diamin and an acidylized derivative of a 2.6-diamino-5-naphthol compound having the formula:

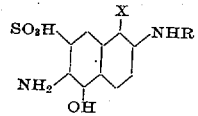

are formed. They dissolve in concentrated sulfuric acid with from a violet to green color.

In order to carry out this process we can *e. g.* proceed as follows, the parts being by weight: 303 parts of 2-naphthylamin-4.8-disulfonic acid are diazotized and the diazo compound is then combined with 156.5 parts of paraxylidin hydrochlorid in the usual way with the addition of sodium acetate, the intermediate compound is precipitated by the addition of hydrochloric acid, filtered off and transformed into its sodium salt. This is redissolved and rediazotized at about 20° C. The diazo compound is then added to a solution of 365 parts of the sodium salt of 2-benzoylamino-5-naphthol-7-sulfonic acid. The combination is completed by the addition of sodium carbonate.

The dye is isolated in the usual way and purified by re-solution in water. It is, after being dried and pulverized, in the shape of its sodium salt a greenish powder which is soluble in water with a red color and which is soluble in concentrated sulfuric acid with a greenish-blue color. By reduction with stannous chlorid and hydrochloric acid 2-naphthylamin-4.8-disulfonic acid, 2.5-dimethyl-1.4-diaminobenzene and 2-benzoylamino-6-amino-5-naphthol-7-sulfonic acid are obtained. The new dyestuff dyes cotton dark red shades.

The process is carried out in an analogous way on starting from other of the above defined aminoazo compounds *e. g.* from those obtained from alpha-naphthylamin-2.5- or 3.6-disulfonic acid, beta-naphthylamin-1.6- or 3.6-disulfonic acid, 1.5-aminonaphthol-7-sulfonic acid, 1.5-aminonaphthol-2.7-disulfonic acid, 2.5-aminonaphthol-7-sulfonic acid or 2.5-aminonaphthol-1.7-disulfonic acid and or on using other amins as second components for the production of the aminoazo compounds, *e. g.* meta-toluidin, anilin, cresidin, alpha-naphthylamin, alpha-naphthylamin-6- or 7-sulfonic acid or on using other end components, *e. g.* 2-ethylurethane-5-naphthol-7-sulfonic acid or 1-7-disulfonic acid, 5.5-dioxy-7.7-disulfonic acid 2.2. dinaphthylurea, acetyl-2.5-aminonaphthol-7-sulfonic acid, 2-methylurethane-5-naphthol-7-sulfonic acid, 2-phenylurethane-5-naphthol-7-sulfonic acid, 2-phenylurea-5-naphthol-7-sulfonic acid, meta-aminobenzoyl-2.5-aminonaphthol-7-sulfonic acid etc.

We claim:

1. The herein described new azo dyestuffs obtainable by combining the diazo compounds of the hereinbefore defined aminoazo compounds with acidylized derivatives of 2-amino-5-naphthol compounds of the above given formula, which dyestuffs are, after being dried and pulverized, in the shape of their alkaline salts dark powders soluble in water, soluble in concentrated sulfuric acid with from a violet to green color; yielding upon reduction with stannous chlorid and hydrochloric acid a naphthylamin, a diamin and an acidylized derivative of a 2.6-diamino-naphthol compound of the above given formula; and dyeing cotton from red to blue shades, substantially as described.

2. The herein described new azo dyestuff which can be obtained from 2-naphthylamin-4.8-disulfonic acid, paraxylidin and 2-benzoylamino-5-naphthol-7-sulfonic acid, which dyestuff is, after being dried and pulverized, in the shape of its sodium salt a greenish powder which is soluble in water with a red color and which is soluble in concentrated sulfuric acid with a greenish-blue color; yielding upon reduction with stannous chlorid and hydrochloric acid 2-naphthylamin-4.8-disulfonic acid, 2.5-dimethyl-1.4-diaminobenzene and 2-benzoylamino-6-amino-5-naphthol-7-sulfonic acid; and dyeing cotton dark red shades, substantially as described.

In testimony whereof we have hereunto set our hands in the presence of two subscribing witnesses.

LEOPOLD HESSE. [L. S.]
OSCAR GÜNTHER. [L. S.]
ARTHUR ZART. [L. S.]

Witnesses:
OTTO KÖNIG,
C. J. WRIGHT.

---

Correction in Letters Patent No. 931,424.

It is hereby certified that in Letters Patent No. 931,424, granted August 17, 1909, upon the application of Leopold Hesse and Oscar Günther, of Elberfeld, and Arthur Zart, of Vohwinkel, near Elberfeld, Germany, for an improvement in "Azo Dyes," an error appears in the printed specification requiring correction as follows: Page 2, line 6, the numerals and words "2.6-diamino-naphthol" should read *2.6-diamino-5-naphthol;* and that the said Letters Patent should be read with this correction therein that the same may conform to the record of the case in the Patent Office.

Signed and sealed this 5th day of October, A., D. 1909.

[SEAL.]

C. C. BILLINGS,

*Acting Commissioner of Patents.* soluble in water, soluble in concentrated sulfuric acid with from a violet to green color; yielding upon reduction with stannous chlorid and hydrochloric acid a naphthylamin, a diamin and an acidylized derivative of a 2.6-diamino-naphthol compound of the above given formula; and dyeing cotton from red to blue shades, substantially as described.

2. The herein described new azo dyestuff which can be obtained from 2-naphthylamin-4.8-disulfonic acid, paraxylidin and 2-benzoylamino-5-naphthol-7-sulfonic acid, which dyestuff is, after being dried and pulverized, in the shape of its sodium salt a greenish powder which is soluble in water with a red color and which is soluble in concentrated sulfuric acid with a greenish-blue color; yielding upon reduction with stannous chlorid and hydrochloric acid 2-naphthylamin-4.8-disulfonic acid, 2.5-dimethyl-1.4-diamino-benzene and 2-benzoylamino-6-amino-5-naphthol-7-sulfonic acid; and dyeing cotton dark red shades, substantially as described.

In testimony whereof we have hereunto set our hands in the presence of two subscribing witnesses.

LEOPOLD HESSE. [L. S.]
OSCAR GÜNTHER. [L. S.]
ARTHUR ZART. [L. S.]

Witnesses:
OTTO KÖNIG,
C. J. WRIGHT.

---

Correction in Letters Patent No. 931,424.

It is hereby certified that in Letters Patent No. 931,424, granted August 17, 1909, upon the application of Leopold Hesse and Oscar Günther, of Elberfeld, and Arthur Zart, of Vohwinkel, near Elberfeld, Germany, for an improvement in "Azo Dyes," an error appears in the printed specification requiring correction as follows: Page 2, line 6, the numerals and words "2.6-diamino-naphthol" should read *2.6-diamino-5-naphthol;* and that the said Letters Patent should be read with this correction therein that the same may conform to the record of the case in the Patent Office.

Signed and sealed this 5th day of October, A., D. 1909.

[SEAL.]

C. C. BILLINGS,

*Acting Commissioner of Patents.*

Correction in Letters Patent No. 931,424.

It is hereby certified that in Letters Patent No. 931,424, granted August 17, 1909, upon the application of Leopold Hesse and Oscar Günther, of Elberfeld, and Arthur Zart, of Vohwinkel, near Elberfeld, Germany, for an improvement in "Azo Dyes," an error appears in the printed specification requiring correction as follows: Page 2, line 6, the numerals and words "2.6-diamino-naphthol" should read *2.6-diamino-5-naphthol;* and that the said Letters Patent should be read with this correction therein that the same may conform to the record of the case in the Patent Office.

Signed and sealed this 5th day of October, A., D. 1909.

[SEAL.]

C. C. BILLINGS,
*Acting Commissioner of Patents.*